(12) United States Patent
Perrier et al.

(10) Patent No.: US 9,048,010 B2
(45) Date of Patent: Jun. 2, 2015

(54) METHOD FOR PREPARING AN ELECTRICALLY CONDUCTING ARTICLE

(75) Inventors: Olivier Perrier, Neuville aux Bois (FR); Dominique Rocle, Fleury les Aubrais (FR); Grégoire Delacourt, Tours (FR); Hervé Galiano, Joue les Tours (FR); Philippe Mazabraud, Orleans (FR); David Descarsin, Ballan Mire (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 871 days.

(21) Appl. No.: 13/145,775

(22) PCT Filed: Jan. 29, 2010

(86) PCT No.: PCT/EP2010/051049
§ 371 (c)(1),
(2), (4) Date: Nov. 1, 2011

(87) PCT Pub. No.: WO2010/086397
PCT Pub. Date: Aug. 5, 2010

(65) Prior Publication Data
US 2012/0038079 A1      Feb. 16, 2012

(30) Foreign Application Priority Data
Jan. 29, 2009   (FR) .................................. 09 50553

(51) Int. Cl.
*C04B 35/00* (2006.01)
*H01B 1/24* (2006.01)
(Continued)

(52) U.S. Cl.
CPC ............... *H01B 1/24* (2013.01); *H01M 8/0221* (2013.01); *H01M 8/0226* (2013.01); *H01M 2008/1095* (2013.01); *Y02E 60/50* (2013.01)

(58) Field of Classification Search
USPC .......................... 264/105, 618, 619, 104, 241
See application file for complete search history.

(56) References Cited

U.S. PATENT DOCUMENTS 6,248,467 B1    6/2001  Wilson et al.
6,277,519 B1 *  8/2001  Ishii et al. .................. 429/218.2
(Continued)

FOREIGN PATENT DOCUMENTS

EP    0 007 078         1/1980
EP    0044816     *     7/1981
(Continued)

OTHER PUBLICATIONS

Preliminary Search Report for French Patent Application No. FR 0950553, dated Nov. 24, 2009, in one page.
(Continued)

*Primary Examiner* — Stella Yi
(74) *Attorney, Agent, or Firm* — Knobbe Martens Olson & Bear LLP (57) ABSTRACT

A method for manufacturing an electrically conducting article is disclosed. According to some aspects, the method includes dry mixing a powder comprising at least one thermosetting resin, a hardener compound powder for the resin and an electrically conducting filler powder, the thermosetting resin including at least two epoxide groups. The method further includes thermocompressing the mixture of powders in a mold with a shape adapted to the article and at an effective temperature for obtaining cross-linking of the resin.

17 Claims, 3 Drawing Sheets

(51) Int. Cl.
    *H01M 8/02* (2006.01)
    *H01M 8/10* (2006.01)

(56) References Cited

U.S. PATENT DOCUMENTS

| | | | |
|---|---|---|---|
| 2003/0235750 A1 | 12/2003 | Tanno | |
| 2004/0262584 A1* | 12/2004 | Bonnet et al. | 252/511 |
| 2005/0075430 A1* | 4/2005 | Edmondson et al. | 524/247 |
| 2005/0123822 A1* | 6/2005 | Ishikawa et al. | 429/39 |
| 2007/0154771 A1 | 7/2007 | Jang et al. | |

FOREIGN PATENT DOCUMENTS

| | | |
|---|---|---|
| GB | 1 547 156 | 6/1979 |
| JP | 63008414 | 1/1988 |
| WO | WO 2007/003743 A2 | 1/2007 |

OTHER PUBLICATIONS

Lee et al., "Corrosion-resistant component for PEM fuel cells", Journal of Power Sources 131 (2004) 162-168.

Database WPI Week, Aug. 1988, Thomson Scientific, London, GB—052844—XP-002556803, pp. 1-2.

International Search Report dated Jun. 1, 2010, from related application PCT/EP2010/051049.

* cited by examiner

METHOD FOR PREPARING AN ELECTRICALLY CONDUCTING ARTICLE

TECHNICAL FIELD

The present invention relates to a method for preparing an electrically conducting article.

This method is particularly suitable for preparing current collectors, in particular bipolar plates used in fuel cells with a proton exchange membrane (known under the terminology of PEMFC cells, PEMFC meaning "Proton Exchange Membrane Fuel Cell"), proton exchange membrane electrolyzers and in supercapacitors.

One of the main fields of the invention may therefore be considered as that of fuel cells.

BACKGROUND

A fuel cell includes a stack of elementary cells, within which an electrochemical reaction occurs between two reagents which are introduced continuously. The fuel, such as hydrogen, for cells operating with $H_2/O_2$ mixtures, or methanol for cells operating with methanol/oxygen mixtures, is brought into contact with the anode, while the oxidizer, generally oxygen, is brought into contact with the cathode. The anode and the cathode are separated by an electrolyte, of the proton exchange membrane type. The electrochemical reaction, the energy of which is converted into electric energy, is split into two half-reactions:

- oxidation of the fuel occurring at the anode/electrolyte interface producing, in the case of cells operating with $H_2$, $H^+$ protons which will cross the electrolyte towards the cathode, and electrons which join the outer circuit, in order to contribute to the production of electric energy;
- a reduction of the oxidizer occurring at the electrolyte/cathode interface with production of water in the case of cells operating with $H_2$.

The electrochemical reaction, strictly speaking, occurs at an electrode-membrane-electrode assembly.

In order to ensure the operation of electric appliances, it is necessary to obtain an electric power considerably greater than the power delivered by a single electrode-membrane-electrode assembly. In this perspective, the electrode-membrane-electrode assemblies are most often arranged as a stack, the electric continuity between the different assemblies being ensured by means of conducting plates, said bipolar plates.

In addition to the current collecting function, bipolar, plates also have to ensure the following functions:

- distribution of the reagents and removal of the products at the anode and at the cathode, the reagents being hydrogen and oxygen and the products, water for cells operating with $H_2/O_2$;
- removing the heat produced during the electrochemical reaction;
- mechanical structuration of the stack of constitutive elementary cells of the fuel cell.

Thus, the constitutive materials of the bipolar plates have to meet the following criteria:

- sufficient electric conductivity in order to efficiently collect the electric current produced by the elementary cells;
- good heat conductivity in order to remove the heat produced during the electrochemical reaction at the elementary cells;
- good mechanical properties so as to be able to withstand the stresses related to the assembling of the constitutive elementary cells of the fuel cell and to also withstand handling operations during the mounting of the fuel cell;
- heat stability in order to guarantee the integrity of the assembly in the ranges of the temperature of use of the fuel cell;
- chemical stability with regard to the fluid present in the core of the fuel cell (for example water, acid) so as to be able to maintain the performances of the material and to avoid decomposition of the latter and thus pollution of the anode and of the cathode with which it is in contact;
- impermeability to the reagents (for example, hydrogen and oxygen), greater than that of the proton exchange membrane;
- surface hydrophobicity in order to facilitate discharge of the water formed during the electrochemical reaction;
- capability of being shaped, so as to allow the formation of distribution channels at the surface of the plates and this preferably without requiring any machining phase for forming said channels.

The bipolar plates presently used may be subdivided into three categories:

- bipolar plates in graphite;
- metal bipolar plates; and
- bipolar plates in an organic composite material.

As regards graphite plates, it is difficult to contemplate their use on an industrial scale because of their very high cost essentially due to the machining phase required for manufacturing the distribution channels.

As regards metal bipolar plates, they have a set of properties (mechanical strength, seal, electric conductivity, capability of being shaped), which make them candidates of choice for the design and making of inexpensive bipolar plates.

However, their density above that of graphite imposes their use in the form of thin sheets shaped by stamping. Under such conditions, the designs of the channels are limited (the ultimate elongation limit of the material conditioning the geometry of the channels). On top of that, the stamping technique only allows formation of channels on one face of a plate, which requires association of two stamped half plates so as to obtain a resulting plate including channels on both of its faces.

For bipolar plates made from metal sheets shaped by stamping, the arrival of the fluids and the removal of the formed products are achieved in locally planar areas of the bipolar plate, which requires the use of a frame having a suitable shape and capable of ensuring the peripheral seal, as described in WO 2007/03743. This technique has the drawback of requiring for a same bipolar plate an additional part intended to ensure the junction between two combined plates in order to form the bipolar plate and ensure supplies and removals of fluid and of product. Final bipolar plates which are less compact than expected are the result of this.

Finally, one of the problems inherent to the use of metal for forming bipolar plates lies in corrosion phenomena induced by the contact of the plates with aqueous media. In order to find a remedy to this, certain authors (such as those of the publication *J. Power. Sources,* 131 (2004), p. 162-168) propose the transfer of protective coatings onto said plates in order to limit the corrosion phenomenon. However, this generates a method for manufacturing the latter which is more complex to apply.

As regards the plates in organic composite materials, the latter consist in plates comprising an organic polymer matrix in which electrically conducting particles are dispersed. The particles provide the bipolar plates with electric conductivity required for collecting the current and the polymeric matrix provides the mechanical strength required for assembling the different constitutive elements of the fuel cell in which the bipolar plates are arranged.

The conducting particles may be metal particles, which has the advantage of good electric conductivity. On the other hand, they however have the drawback of having high density and of being sensitive to the chemical environment.

The conducting particles may also be carbon-based products, appearing as powders, such as carbon black, graphite powders or carbon fibers.

Conventionally, the plates are made by incorporating conductive particles into a liquid resin followed by shaping with hardening of the resin, as described in U.S. Pat. No. 6,248,467.

However, the use of a raw material as a liquid, in this case a liquid resin, causes the following drawbacks:
- an instability of the system before molding because of the difficulty of controlling the cross-linking reaction of the liquid resin;
- a heterogeneity of the system before molding because of the association of a liquid resin with solid particles of an electrically conducting filler;
- an exudation phenomenon of the resin during the shaping of the article, which generates an article comprising a non-homogeneous distribution of the electrically conducting particles and an insulating surface of the article because of the concentration of the exudated resin at this level.

In order to do away with these difficulties, certain authors have proposed to work from solid reagents (solid resin, conducting particles). However, the mixtures described in these documents have to be made in a molten phase before shaping, for example by hot calendering. This mixing step in the molten phase, however, generates highly significant additional expenditure, which proves to be incompatible with large scale industrialization of the manufacturing of bipolar plates. On top of that, the obtained plates do not meet the requirements of the specifications of the application notably those relating to the planar electric conductivity.

Thus, there exists a real need for articles conducting electricity, in particular bipolar plates, and methods for manufacturing the latter, which may be achieved simply, in a limited number of steps and at a lesser cost, while limiting the energy balance of these steps, compatible with an industrial application and which preferably suppress long and costly machining operations, these methods also having to give the possibility of obtaining conductive articles having efficient performances in terms of electric conductivity, of mechanical strength and of removal of the water produced over time when these are bipolar plates.

DESCRIPTION OF CERTAIN INVENTIVE ASPECTS

Thus, the invention relates to a method for manufacturing an electrically conducting article comprising the following steps:
- a step for mixing via a dry route a powder comprising at least one thermosetting resin comprising at least two epoxy groups, a hardener compound powder of said resin and a powder of an electrically conducting filler;
- a step for thermocompression of the mixture of the powders obtained in the previous step in a mold with a shape adapted to the article and at an effective temperature for obtaining cross-linking of the resin, at the end of which the electrically conducting article is obtained.

The following advantages result from the application of this method:
- a not very energy-consuming method, notably because the mixing step is achieved via a dry route which does not involve heating, as this is the case for mixing steps intended to obtain products as pastes;
- a not very energy-consuming method also from the fact that the resin is a thermosetting resin, which implies that the article at the end of the process does not need to be cooled when it needs to be removed from the mold, which is not generally the case when the article is made from a thermoplastic resin:
- a fast easy-to-apply method, from the fact that the article may after the powder mixing step be made in a single thermocompression step without requiring any preliminary transformation and without requiring any subsequent machining step;
- a method initially applying a stable mixture of powders, because of operating via a dry route, which may allow the mixture of powders from the first step to be stored before the shaping step by thermocompression;
- a method giving the possibility of obtaining an electrically conducting article having effective properties in terms of electric conduction and mechanical properties;
- a method which may be applied industrially on a large scale, because of the few steps required for obtaining said articles;
- an inexpensive method to apply, because of the low cost of the epoxy resins used and of the ease for shaping the mixture of powders without passing through subsequent machining steps in order to form the desired article.

Thus, the method comprises a first step consisting of mixing via a dry route, a powder comprising at least one thermosetting resin comprising at least two epoxy groups, a hardener compound powder for said resin and a powder of an electrically conducting filler.

It is specified that by a dry route, is conventionally meant a mixing step which does not involve liquid compounds, such as solvents and molten phases, the different constituents of the mixture remaining as solid powders and not requiring heating. The result of this is a simple and not very energy-consuming step and a mixture of powders not having been subject to a step for cross-linking the thermosetting resin before transformation of the latter during the thermocompression step.

It is specified that by thermocompression is conventionally meant a step for shaping the mixture of powders into the desired article comprising application of pressure to said mixture at an effective temperature in order to ensure cohesion of the mixture of powders so as to form the article, this step may for example be achieved in an injection press or in a simple compression press and not requiring any step for melting the mixture of powders beforehand, before the shaping.

The powder comprising at least one thermosetting resin comprising at least two epoxide groups may have an average particle size ranging from 10 to 500 μm, as well as for the hardener compound powder for said resin as well as for the electrically conducting filler powder.

Advantageously, the powder comprising at least one thermosetting resin comprising at least two epoxide groups, the hardener compound powder for said resin as well as the electrically conducting filler powder have an average particle size ranging from 75 to 150 μm.

The thermosetting resin is an epoxide resin comprising at least two epoxide groups, i.e. groups having the following unit:

Particularly advantageous resins which may be used for the method of the invention fit the following formulae:

$n_1$ representing the number of recurrences of the unit taken between square brackets;

$n_2$ representing the number of recurrences of the pattern taken between square brackets, and mixtures of the latter.

It is particularly interesting to work with epoxide resins, since these resins, after cross-linking by the action of the hardener compound, do not generate any third species, and thus generate an article having low shrinkage after cross-linking of the resin and excellent dimensional stability.

The use of other types of resins often causes during cross-linking the formation of a third species such as water (this is notably the case of phenolic resins) and therefore residual porosity in the materials after cross-linking, which would be detrimental for electrically conducting articles intended to be used as bipolar plates, since the porosity may generate an increase in the gas permeability and also a reduction in the mechanical properties.

On top of that, the use of resins as mentioned above, gives the resulting material after cross-linking, excellent properties in terms of rigidity, thermal and chemical stability, adherence with fillers, which makes these resins, because of their intrinsic properties and how they are applied, much more attractive than thermoplastic polymers conventionally encountered in the prior art.

The hardener compound conventionally is according to the invention, a compound capable of generating the cross-linking reaction (it may therefore be also described as a cross-linking agent) of the aforementioned resin, for example by opening epoxide rings, these hardener compounds thus comprising at least one function capable of reacting with the epoxide rings of said resins. Adequate hardener compounds may be compounds containing at least one amine function. These may notably be aliphatic amine compounds, amidoamines, polyamides, polyetheramines, cycloaliphatic amines, anhydrides, aromatic amines, imidazole compounds.

As an example, the cross-linking reaction of an epoxide resin with an amine compound may be schematized in the following way:

Other compounds may generate cross-linking of epoxide resins.

In particular, imidazole compounds used as hardener compounds are particularly appreciated. Indeed, they cause homopolymerization of an epoxide resin, which means that the units from the polymerization of the resin are directly bound to each other, without there being any cross-linking nodes from hardener compound molecules. The result after polymerization is a denser, more rigid material having a higher glassy transition temperature than those obtained with a hardener being included between two units from the resin during polymerization.

As an example of a hardener compound, mention may be made of the dicyandiamide of the following formula:

As an example of a hardener compound, mention may be made of 2-phenylimidazole of the following formula:

The electrically conducting filler powder may be a powder of all electrically conducting materials. Thus, these may be metal powders, metal oxide powders, powders of carbonaceous materials.

Preferably, the electrically conducting filler powder used within the scope of the method of the invention is a particularly advantageous carbonaceous material powder because of its chemical inertia and its low density.

Mention may notably be made as a carbonaceous material powder, of graphite powders, carbon black powders, in particular synthetic graphite powders, which have the advantage of not comprising any impurities detrimental to the conductivity of the material, unlike natural grades from mining.

As carbon black powders, mention may be made of the commercial powders Ensaco 350G with a specific surface area of 770 m$^2$/g, Ensaco 250G with a specific surface area of 65 m$^2$/g.

As synthetic graphite powders, mention may be made of the commercial powders Timrex KS 150 with a specific surface area of 3 m$^2$/g, Timrex KS 75 with a specific surface area of 6.5 m$^2$/g.

Like other types of electrically conducting fillers, lamellar graphite, carbon fibers, carbon nanotubes and in particular lamellar graphite in addition to those mentioned above may be contemplated.

When lamellar graphite is optionally added in addition to graphite powder, the lamellar graphite will, in addition to the fact of giving electron conductivity to the material, also allow, after the thermocompression step, when the graphite lamellas are arranged perpendicularly to the flow of gas arriving on the formed article, an increase in the tortuosity of the gas, and consequently improvement in the impermeability of the material towards these gases.

Further, the mixings step may incorporate other additives, such as catalysts, plasticizers, flexibilizers, nucleation agents, hyperdispersants, anti-caking agents, and reactive diluents.

It is understood that these additives will also appear as solid powders advantageously having an average particle size ranging from 10 to 500 μm.

In particular, it may be appropriate to add to the aforementioned mixture of powders, a catalyst powder, so that during the thermocompression, the cross-linking rate of the resin is improved. Adequate catalysts make the compounds capable of easily yielding a hydrogen, such as phenolic, alcoholic, acid, amine compounds. More specifically, these may be aliphatic amines, imidazole compounds, substituted ureas, such as a compound of the following formula:

In order to obtain the powders having the aforementioned average particle sizes, it may be necessary to proceed with a milling and sifting step, in order to only retain the particles having the desired size.

For example, the different constitutive powders of the mixture have identical average particle size.

From the point of view of the proportions of powders in the aforementioned mixture, the electrically conducting filler powder may account for 50% to 95% by mass based on the total mass of the mixture, while the other powders (resin powder, hardener compound powder and optionally other additive powders) may account for 5% to 50% by mass based on the total mass of the mixture. Advantageously, the electrically conducting filler powder accounts for 80% to 92% by mass based on the total mass of the mixture.

Such a proportion of electrically conducting filler powder may give the possibility of obtaining, after transformation, an electrically conducting article having very high conductivity (greater than 150 S/cm).

The different aforementioned powders are dry mixed, so as to avoid any preliminary melting and onset of cross-linking of the resin, the mixture may for example be made at room temperature. The mixing may be carried out by displacing the particles relatively to each other. This displacement may be generated by a stirring system (for example, the ploughs or ribbons of a convective mixer, the blades of a high shear mixer), by an air flow (for example, with an impaction mixer) or by the rotation of a tank comprising said mixture. In this scenario, the rotation of the tank should drive the mixture until the dynamic angle of repose is exceeded, so that the particles then enter into motion relatively to each other.

Preferably, the mixing step is carried out in a convective mixer or with a rotating tank, which does not provide too much energy to the particles, which may generate a rise in the temperature and possibly cross-linking of the resin during the mixing step, which is banned in the method of the invention.

According to a particular embodiment of the invention, the mixing step may be split into two sub-steps:

- the mixing of the reactive system comprising resin powder, hardener compound powder and optionally the catalyst powder;

the mixing of the reactive system with the electrically conducting filler powders(s).

Advantageously, the mixtures of powders may be the following:

a mixture of powders comprising:
    an epoxy resin powder of the following formula:

$n_1$ representing the number of recurrences of the unit taken between square brackets, for example $n_1$ is greater than 1.5;

a dicyandiamide hardener compound powder of the following formula:

a catalyst powder of the following formula:

and;
a synthetic graphite powder and optionally lamellar graphite;

a mixture of powders comprising:
    a powder of epoxide resin of the following formula:

$n_2$ representing the number of recurrences of the unit taken between square brackets;

a powder of epoxide resin of the following formula:

$n_1$ representing the number of recurrences of the unit taken between square brackets, for example $n_1$ is greater than 1.5;

a powder of dicyandiamide hardener compound of the following formula:

a powder of catalyst of the following formula:

and;
a powder of synthetic graphite;

a mixture of powders comprising:
a powder of epoxide resin of the following formula:

$n_1$ representing the number of occurrences of the unit taken between square brackets;
a powder of imidazole hardener compound of the following formula:

and;
a powder of synthetic graphite.

These specific mixtures of powders are obtained from commercial products according to the European Directive in effect, RoHS (Restriction of the use of certain Hazardous Substances in electrical and electronic equipment). The transformation of these mixtures by cross-linking of the resin does not generate any toxic or noxious species.

The mixtures of powders from the mixing step of the method of the invention, and in particular, the specific mixtures mentioned above, are particularly stable and may be stored at room temperature for several months, ready to use, without degradation of the properties of the article formed by the transformation of said mixtures of powders.

Once the mixing step is completed, the resulting mixture of powders is subject to a step for thermocompression of the mixture of powders obtained in the previous step in a mold with a suitable shape for obtaining the desired article and at an effective temperature for obtaining cross-linking of the resin, at the end of which the electrically conducting article is obtained.

During this step, the mixture of powders is transformed by densification of the resulting mixture generated by the cross-linking of the resin. A pressure of less than or equal to 1 t/cm², ideally comprising 250 and 750 kg/cm² is advantageously exerted. By exerting this pressure on the mixture of powders in addition to compaction of the mixture, it is possible to reduce the distance between the electrically conducting filler particles.

The pressure is preferably maintained for a duration longer than the cross-linking duration of the epoxide resin.

In parallel and/or prior to the application of pressure to the mixture, the mixture is heated to a temperature required for cross-linking of the resin.

The temperature and the duration of the heating cycle depend on the epoxide resin/hardener pair and on the catalyst, when it is present. The heating cycle may vary from 2 to 30 minutes for a temperature ranging from 50 to 250° C.

As mentioned above, the step is performed in a mold, the shape of which is adapted in order to obtain the desired article, which means in other words that the mold should have a design and a shape such that after the thermocompression step, the article resulting from this step has the sought definitive shape, without it being necessary to machine said article in order to give it its definitive shape.

According to a particular embodiment, the thermocompression step may be applied in the following way:
introducing the mixture of powders into a hot mold (a temperature above the polymerization temperature of the resin), the mold having dimensions corresponding to the dimensions of the intended article, the mold notably including imprints so as to generate the design of the distribution channels at the surface of the articles, if the latter are intended to form bipolar plates;
closing the mold followed by loading. The pressure may be applied gradually in order to evacuate the air comprised in the material in the form of a powder. Under the effect of heat, the compounds of the mixture begin to melt. The polymerization reaction is initiated when the compounds have reached the activation temperature of the hardener. The pressure is maintained until the end of the polymerization reaction of the resin;
once the polymerization is completed, the resulting article is removed from the mold without any preliminary cooling.

The mold may be covered with a layer of a mold release agent or with a specific surface treatment, in order to optimize the extraction of the molded articles.

It will be specified that the use of a thermosetting resin allows reduction in the energy cost for manufacturing the aforementioned articles. Indeed, if a thermoplastic resin were used, it would be necessary, after the thermocompression step, to proceed with cooling the mold so that the article again becomes solid and may be extracted from the mold.

The method of the invention is particularly suitable for preparing bipolar plates for fuel cells, notably bipolar plates advantageously having the following characteristics:
an electric conductivity of at least 150 S/cm;
a heat conductivity of at least 15 W/mK;
a flexural modulus of at least 10 GPa;
an ultimate rupture stress of at least 40 MPa;
a contact angle of at least 100°;
a permeability to hydrogen of less than $2 \times 10^{-6}$ cm³/s·cm² (measured at 80° C. under 3 atm).

The invention will now be described in connection with the following examples given as an illustration and not as a limitation.

DETAILED DESCRIPTION OF CERTAIN ILLUSTRATIVE EMBODIMENTS

Examples 1 to 3 above aim at demonstrating the motivated selection of the characteristics of the raw materials and of the operating conditions within the scope of the invention for making bipolar plates.

In these examples, it is proceeded with the measurement of different quantities (electric conductivity, heat conductivity, thermal properties, permeability, wettability), the measurement procedures of which appear below.

a) Electric Conductivity

Conduction of electricity by the plate expresses possible passing of the electrons within the constitutive composite material of the bipolar plates. This electron transfer is accomplished via electrically conducting filler particles.

There exists a global resistance of the composite material due to the discontinuity of the material. This global resistance is due both to the constriction resistance (due to the small contact surface area between the filler particles) and to the tunnel resistance (due to the thickness of the insulating film at the surface of these same particles).

The constriction resistance depends on the geometry of the electrically conducting particles and on the compaction of the composite material (notably the packing and deformation of the particles on each other).

The tunnel resistance, as for it, depends on the proportion of resin within the composite material. Electron conduction is then accomplished by electron jump between insulated particles, generating a local electric field.

The electric conductivity σ (in S/cm) is determined by measuring the electric resistivity ρ (in Ω·cm) of the material by the Werner method, a so-called 4-point method.

An alternating current I is sent into the material to be characterized from two extreme points. The potential difference V is measured between both internal points. The points are equidistant by a distance d.

The resistivity ρ (in Ω·cm) fits the following formula:

$$\rho = (2\Pi d)^*(V/I)$$

the conductivity corresponding to the reciprocal of the resistivity.

b) Heat Conductivity

From an atomic point of view, heat conductivity is related to two types of behaviors:
- the movement of charge carriers, electrons or holes;
- the oscillation of the atoms around their equilibrium position.

Heat conductivity is therefore related to electric conductivity (motion of the charge carriers) on the one hand and to the actual structure of the material (vibration of the atoms) on the other hand.

The heat conductivity Λ (W/mK) is directly measured on the article of the invention (a plate molded by hot compression).

To do this, the sensor is positioned on the main surface of the article (in order to determine the planar conductivity) or on its edge (in order to determine the transverse conductivity).

A resistive sensor is used. The electric current applied to the sensor generates a known amount of heat transmitted to the article. The dissipation of this amount of heat is analyzed by the sensor (which is reflected by a decrease in the electric current).

This measurement method is not destructive.

c) Mechanical Properties

It is proceeded with the application of a flexural test procedure (according to the NF EN ISO 178 standard) to the obtained composite materials, this stress being comparable with the forces experienced by the bipolar plates during their mounting as a stack.

The three-point flexural tests are conducted according to the NF EN ISO 178 standard.

From an experimental point of view, the force F-deflection Y curve is recorded from which it is possible to calculate the rupture stress $\sigma_R$ and the flexural Young modulus $E_f$. The stresses and deformation are determined by the following equations:

$$\sigma_R = (3F_R D / 2bh^3)$$

$$E_f = (D^3 / 4bh^3)(F/Y)$$

Wherein:
- $F_R$ represents the breaking force;
- Y represents the deflection at break;
- D represents the distance between supports;
- b represents the width of the specimen;
- h represents the thickness of the specimen;
- F/Y represents the slope at the origin of the experimental force F-deflection Y curve.

The specimens are taken from plates molded by thermocompression and tested on a dynamometer.

d) Permeability

The gas flow passing through a known thickness of the material is measured over time. The permeation coefficient of the material is inferred from the following formula:

$$Pe = (\Phi^* e)/(A^* \Delta P)$$

with
- Φ: gas flow (in mbars·l/s)
- e: thickness of the sample
- A: surface area of the sample
- ΔP: upstream/downstream pressure difference e) Wettability—Hydrophobicity This property is evaluated by measuring the contact angle of a drop of water at the surface of the plate.

This method consists of depositing a drop of liquid on the surface of substrate. The wettability of the surface is then characterized by the contact angle θ formed by the solid surface and the tangent to the liquid surface at the connecting point.

EXAMPLE 1

This example aims at illustrating the influence of the average particle size of the electrically conducting filler on the electric conductivity of the material and, consequently on the heat conductivity.

Different formulations were prepared with fillers of various grain sizes by dry mixing for identical filler levels.

The developed and applied formulations consist of the same matrix (reactive system). Only the grain size of the electrically conducting filler varies, which is synthetic graphite of the type defined in the table of Example 4 below. The filler mass level for each formulation is 85% by mass, based on the total mass of the mixture.

The reactive system, as for it, comprises the following ingredients:
- a DGEBA resin with a formula as defined in Example 4 below with a functionality of 2, of epoxide equivalent 475-550 g/equiv. (DER 671 from Dow) (100 parts) having grain size characteristics such that 90% by volume of the particles have an average particle size of less than or equal to 480 μm and among the total population of particles, 50% by volume of the particles have an average particle size of less than or equal to 150 μm;
- a dicyandiamide hardener of a formula as defined in Example 4 below (Amicure CG 1200 from Air Products) (2.5% of parts of resin) having an average particle size of less than 50 μm;
- a substituted urea catalyst of a formula as defined in Example 4 below (Amicure UR2T from Air Products) (0.5% of parts of resin) having an average particle size of less than 50 μm.

The aforementioned mixtures are shaped by thermocompression according to a method which is identical for each of the mixtures: thermocompression at 180° C. under 1 t/cm² for 30 minutes.

Figure 1:
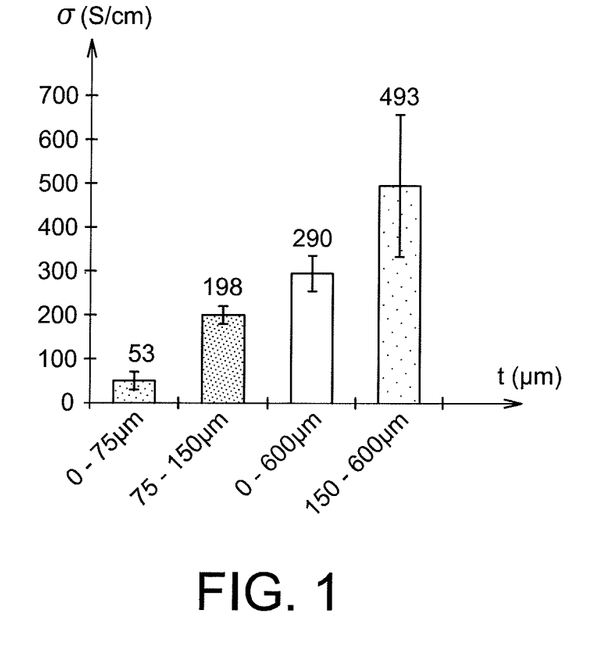
FIG. 1 is a graph illustrating the planar electric conductivity σ (in S/cm) versus the average particle size, t, (in μm) of the electrically conducting filler, for plates manufactured according to Example 1.

The resistivity of the obtained parts is measured and the values are transferred into FIG. 1 illustrating the planar electric conductivity σ (in S/cm) versus the average particle size t (in μm) of electrically conducting filler.

It is specified that the planar electric conductivity corresponds to the measured conductivity in a plane of the material perpendicular to the loading direction.

It emerges from these results that the larger the average particle size of the conducting fillers, the higher is the planar electric conductivity of the material.

However, a contrario, the larger the average particle size, the more depleted is the interface between the matrix and the filler particles, causing weakening of the mechanical properties of the composite material.

On top of that, the size of the filler particles should not be too large, so as not to influence the design of the article.

Thus, by taking into account the whole of these requirements, the authors were able to determine in a motivated way that in this scenario, an electrically conducting composite material comprising graphite particles should have an average particle size (i.e. in this case an average particle diameter because of the global shape of the particles) of the latter advantageously greater than 10 μm and less than 500 μm, preferably ranging from 75 to 150 μm.

It may be contemplated to add to the composite material in addition to the aforementioned graphite particles, lamellar filler particles, so as to limit the formation in the material of preferential paths for the gas molecules and thereby promote the mean free path (or tortuosity) of the latter, the lamellar filler particles may be sheets of expanded graphite.

During the method for shaping the material by thermocompression, it was proceeded with shaping promoting an orientation of the expanded graphite sheets parallel to the main plane of the article and perpendicularly to the loading direction.

From a practical point of view, it was proceeded with the design of an article according to the invention from a mixture $M_4$ as defined in the table of Example 4 below. The synthetic graphite used (Timrex KS150 from TIMCAL Ltd) has an average particle size such that 90% by volume of the particles have an average particle size of less than 150 μm and the lamellar graphite appears as sheets of several hundred μm² of surface area and a few μm of thickness.

The thermocompression parameters are the following: 30 minutes at 180° C. under 1 t/cm².

Figure 2:
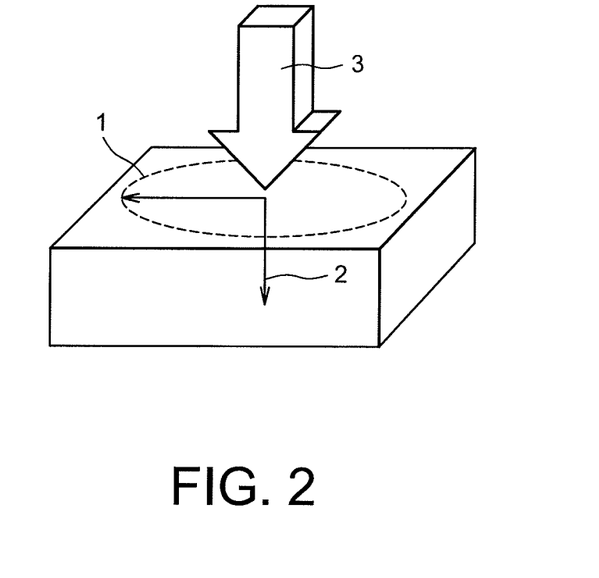
FIG. 2 is a diagram illustrating the directions along which are measured the electric conductivity and the heat conductivity, respectively planar (arrow 1) and transverse (arrow 2), the arrow 3 indicating the loading direction.

From the obtained plate, it was proceeded with the measurement of the heat conductivity and of the electric conductivity in the plane perpendicular to the loading direction (said to be <<planar>> in the table below) and in the plane parallel to the loading direction (said to be <<transverse>> in the table below) (respectively indicated by the arrows 1 and 2 in FIG. 2, the loading direction being indicated by the arrow 3).

The results appear in the table below.

|  | Heat conductivity (in W/mK) | Electric conductivity (in S/cm) |
|---|---|---|
| Planar | >40 | >350 |
| Transverse | >10 | >180 |

In the case of the incorporation of a lamellar filler in addition to the non-lamellar graphite filler, it is interesting in this case that this lamellar filler is positioned along a plane perpendicular to the direction of displacement of the gas molecules (this arrangement being induced by the application of the method), which is also the loading direction. The lamellar filler positioned as planes parallel with each other hinders progression of the reaction gas molecules through the plate.

EXAMPLE 2

This example aims at illustrating the influence of the level of electrically conducting filler particles on the properties of the constitutive material of the bipolar plate made according to this example.

Figure 3:
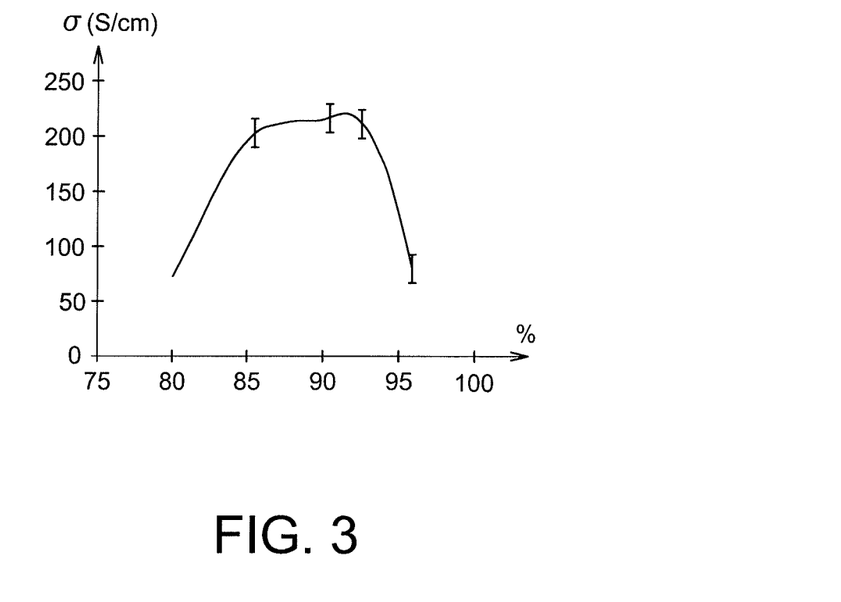
FIG. 3 is a graph illustrating the planar electric conductivity σ (in S/cm) versus the percent loading level (in mass %) of electrically conducting particles for plates manufactured according to Example 2.

To do this, it was proceeded with the preparation of different solid composite mixtures by varying the level of electrically conducting particles (values transferred into FIG. 3).

The different mixtures such as those made explicit in the first part of Example 1 are again used, the filler being a synthetic graphite (Timrex KS150 from TIMCAL Ltd) with a grain size such that 90% by volume of the particles have an average particle size of less than or equal to 150 μm.

The aforementioned mixtures are then shaped according to a thermocompression method at 180° C. under 1 t/cm² for 30 minutes.

The planar electric conductivity of the obtained part is then measured. The results are transferred into FIG. 3, which illustrates the planar electric conductivity σ (in S/cm) versus the electrically conducting filler particle % level (in % by mass).

From this graph, it is possible for this scenario to put forward the following observations:

below a certain proportion of electrically conducting particles (more specifically below 80% by mass), the resistivity of the composite material is high. Indeed, the organic matrix of the material in a large amount forms a thick insulating film at the surface of the electrically conducting particles, thereby generating a high tunnel resistance of the material;

the electric conductivity is optimum for the grain size used here ($D_{90}$=150 μm, $D_{90}$ meaning that 90% of the volume of particles has an average particle size of less than or equal to 150 μm) and a proportion of conductive particles comprised between 85 and 92% by mass;

beyond 92% by mass, the organic matrix is not in sufficient proportion, which generates a porous and brittle composite material.

EXAMPLE 3

This example aims at illustrating the influence of the pressure applied during the thermocompression step on the properties of the constitutive material of the bipolar plate made according to this example.

In order to do this, a same mixture (a mixture $M_1$ as made explicit in the table of Example 4) is shaped by thermocompression at different pressures (0.25; 0.5; 0.75; 1; 1.25 and 1.5 t/cm² respectively) for an unchanged duration and temperature (30 minutes at 180° C.)

It is then proceeded with the measurement of the planar electric conductivity σ (in S/cm).

Figure 4:
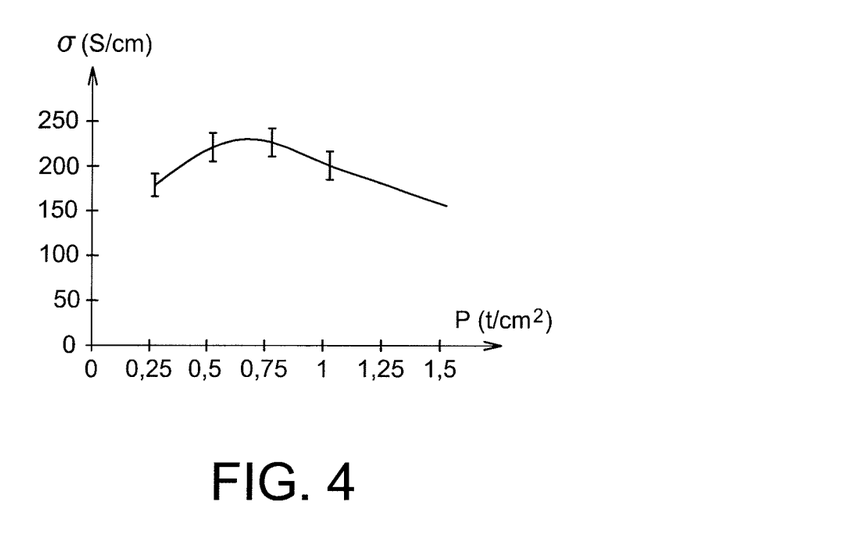
FIG. 4 is a graph illustrating the planar electric conductivity σ (in S/cm) versus the applied pressure P (in t/cm$^2$) for plates manufactured according to Example 3.

The results are transferred into FIG. 4, which illustrates a graph illustrating the planar electric conductivity σ (in S/cm) versus the applied pressure P (in t/cm²).

From these results, the following observations emerge for the particular mixture which is applied:

up to 0.5 t/cm², compaction is increased and thus the planar electric conductivity;

for a certain range of applied pressures (in this case between 0.5 and 0.75 t/cm²), the planar electric conductivity has maximum values. This may be explained by the fact that the electrically conducting particles move closer to each other thereby increasing their contact surface area;

for too high pressures (notably for pressures above 0.75 t/cm²), planar electric conductivity starts to decrease. This may be explained by the fact that the organic matrix exudates, thereby contributing to forming an insulating film at the surface of the composite material.

This exudation phenomenon is also detectable with the measurement of the contact angle of a drop of water placed at the surface of the plates resulting from thermocompression.

Thus, it was also proceeded with the measurement of the contact angle of a drop of water placed in contact with the plate versus the pressure applied to the mixture during the thermocompression step.

Figure 5:
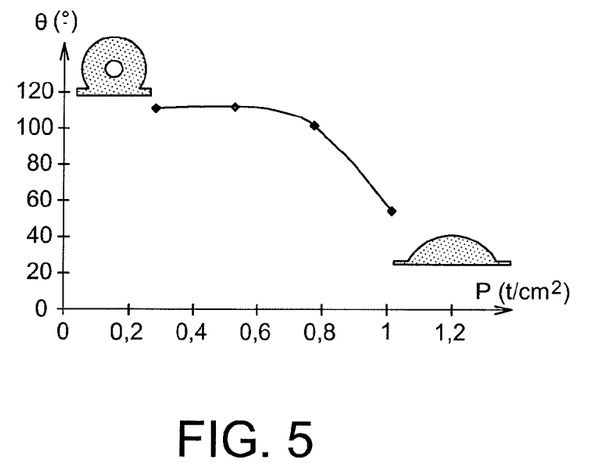
FIG. 5 is a graph illustrating the change in the contact angle θ (in °) versus the applied pressure P (in t/cm$^2$) for plates manufactured according to Example 3.

The results are transferred into the graph of FIG. 5, which is a graph illustrating the change in the contact angle θ (in °) versus the applied pressure P (in t/cm²).

From this graph, it may be observed that the contact angle θ strongly decreases from a pressure of 750 kg/cm², which expresses an increase in the hydrophilicity at the surface of the material because of exudation of the organic matrix.

With respect to the applied mixture, the requirement of working at pressures which are not too high emerges in order to get rid of the exudation phenomenon of the organic matrix. The pressure applied for this type of mixture is preferentially less than 1 t/cm², ideally comprised between 200 and 750 kg/cm², in order to sufficiently compact the composite material in order that it is guaranteed optimal properties.

EXAMPLE 4

This example illustrates the preparation of different mixtures of powders ($M_1$ to $M_4$, respectively) intended to be shaped by thermocompression according to the method of the invention.

The characteristics of these mixtures appear in the table below.

| Reference of the composition | | $M_1$ | $M_2$ | $M_3$ | $M_4$ |
|---|---|---|---|---|---|
| Epoxy Resin | Type | DGEBA | Modified DGEBA Novolac (EPN) | DGEBA | DGEBA |
| | Name | DER 671[1] | DER 642U-20[1] | DER 671[1] | DER 671[1] |
| | Functionality | 2 | 2.6 | 2 | 2 |
| | Epoxy equiv. (g/equiv) | 475-550 | 500-600 | 475-550 | 475-550 |
| Hardener (Average particle size = 40 μm) | Nature | Dicyandiamide | Dicyandiamide | 2-phenylimidazole | Dicyandiamide |
| | Name | Amicure CG1200[2] | Amicure CG1200[2] | Curezol 2PZ[3] | Amicure CG1200[2] |
| | Level (cpr) | 2.5 | 2.5 | 4 | 2.5 |

-continued

| Reference of the composition | | $M_1$ | $M_2$ | $M_3$ | $M_4$ |
|---|---|---|---|---|---|
| Catalyst (Average particle size = 40 μm) | Nature | Substituted Urea | Substituted Urea | — | Substituted Urea |
| | Name | Amicure UR2T[2] | Amicure UR2T[2] | — | Amicure UR2T[2] |
| | Level (cpr) | 0.5 | 0.5 | — | 0.5 |
| Filler 1 | Nature | Synthetic Graphite | Synthetic Graphite | Synthetic Graphite | Synthetic Graphite |
| | Name | Timrex KS 150[4] | Timrex KS 150[4] | Timrex KS 150[4] | Timrex KS 150[4] |
| | Shape | Spherical | Spherical | Spherical | Spherical |
| | Level (mass %) | 85 | 85 | 85 | 65 |
| | Grain size (μm) | 0-150 | 0-150 | 0-150 | 0-150 |
| Filler 2 | Nature | — | — | — | Expanded Graphite |
| | Name | — | — | — | Papyex[5] |
| | Shape | — | — | — | Sheets |
| | Level | — | — | — | 20 |
| | Surface Area (μm) | — | — | — | 100-500 |

[1]Supplier: Dow
[2]Supplier: Air Products
[3]Supplier: Shikoku Chemicals Corporation
[4]Supplier: TIMCAL Graphite&Carbon
[5]Supplier: Carbone Lorraine The DGEBA resin fits the following formula:

$n_1$ representing the number of occurrences of the unit taken between square brackets, $n_1$ being greater than 1.5.

Modified DGEBA resin Novolac (EPN) is a mixture of DGEBA resin of the above formula and of a resin of the following formula:

$n_2$ representing the number of occurrences of the unit taken between brackets, the mixture comprising at least 80% by mass of DGEBA resin.

The dicyandiamide hardener fits the following formula:

The <<substituted urea>> catalyst fits the following formula:

The catalyst <<2-phenylimidazole>> fits the following formula:

For the different mixtures, the solid epoxy resins provided as crystals are milled beforehand to the desired grain size so that 90% by volume of the particles have an average particle size of less than or equal to 300 μm and among the total population of particles, 50% by volume of the particles have an average particle size of less than or equal to 150 μm.

The milling is carried out with a screen mill provided with a suitable perforated grid.

Once the components of the mixture are weighed, the latter are dry blended (corresponding to the terminology <<dry blend>>) in a powder mixer, specifically a rotary tank mixer.

In this mixer, an oscillating cradle is set into motion by two shafts rotating in opposite directions. The resulting movement combines rotation, translation and inversion. This random movement of the particles guarantees homogeneous mixing without segregation between components. The mixing step takes place under optimum hygiene conditions, without any dust, thereby reducing the cleaning operations.

The mixing step may be split into two sub-steps:
the mixing of the reactive system comprising the resin, the hardener and the catalyst;
the mixing of the reactive system with the filler(s).

The resulting mixture has the particularity of being very stable and may be kept in this condition for several months without degradation.

From the mixtures mentioned above (mixtures $M_1$ to $M_4$), it is proceeded with molding of the bipolar plates by thermocompression.

From a practical point of view, the molding is applied in the following way:
the mixture of powders is introduced into a hot mold (with a temperature above the polymerization temperature of the resin), the mold having dimensions corresponding to the dimensions of the intended plate, the mold notably including imprints so as to generate the design of the distribution channels at the surface of the plates;
the mold is then closed and loaded. The pressure may be applied gradually, in order to evacuate the air comprised in the material in the form of powder. Under the effect of heat, the compounds of the mixture begin to melt. The polymerization reaction is initiated when the compounds have reached the temperature for activating the hardener. The pressure is maintained until the end of the polymerization reaction of the resin;
once the polymerization is completed, the resulting plate is then removed from the mold, without any preliminary cooling.

The specific operating conditions of the step for shaping the compositions by thermocompression are summarized in the table below for the different mixtures.

|  |  | Mixture | | | |
| --- | --- | --- | --- | --- | --- |
|  |  | $M_1$ | $M_2$ | $M_3$ | $M_4$ |
| Operating conditions | Pressure (t/cm$^2$) | 0.75 | 0.75 | 0.75 | 0.75 |
|  | Temperature (° C.) | 180 | 180 | 150 | 180 |
|  | Loading time (min) | 20 | 20 | 20 | 20 |

The different bipolar plates obtained with the formulations $M_1$ to $M_4$ were characterized in terms of electric conductivity σ and heat conductivity Λ (planar and transverse, respectively), of mechanical strength (3-point flexural method) (maximum stress at break: max. stress (in MPa) and flexural modulus (in GPa)), of surface tension (method of the contact angle) and of permeability to hydrogen. The heat stability was also evaluated by measuring the glassy transition temperature Tg of the reactive system (i.e. comprising a resin, a hardener and optionally a catalyst).

These data are grouped in the table below.

|  |  |  | Mixture | | | |
| --- | --- | --- | --- | --- | --- | --- |
|  |  |  | $M_1$ | $M_2$ | $M_3$ | $M_4$ |
| Properties | Tg (° C.) |  | 105-110 | 110-115 | 120-125 | 105-110 |
|  | σ (S/cm) | Planar | 200 | 200 | 200 | 350 |
|  |  | Transverse | — | — | — | 180 |
|  | Λ (W/mK) | Planar | 15-20 | 15-20 | 15-20 | 40-45 |
|  |  | Transverse | — | — | — | 10-15 |
|  | Max stress (MPa) |  | 40 | 45-50 | 50-55 | 40 |
|  | Flexural modulus (GPa) |  | 12 | 15 | 15-20 | 10 |
|  | Contact angle (°) |  | 105-110 | 105-110 | 105-110 | 110-120 |
|  | Permeation at 80° C. under 3 atm (cm$^3$/s · cm$^2$) |  | — | — | — | $<2 \cdot 10^{-6}$ |

From these data, the following conclusions are drawn:
the plates obtained with an EPN resin have greater heat stability and better flexural strength than for plates obtained with a DGEBA resin; indeed, the EPN resin is more functional (more than two epoxide sites per molecule), the cross-linking density of the formed material is larger than for a difunctional resin (such as DGEBA);
the plates obtained with a hardener of the imidazole type have excellent rigidity and therefore increased mechanical strength over an extended range of temperatures;
the presence of a lamellar filler allows an improvement in the impermeability towards gases.

The plate made with the mixture $M_1$ was subject to a stacking test conducted by means of a monocell test bench. These tests consist of testing an electrode-membrane assembly positioned between two composite plates made by the method of the invention allowing distribution of the gases and collection of electrons. More specifically, the tested assembly consists of a Nafion NRE212 membrane and two impregnated commercial so-called <<GDE>> Nafion electrodes (E-tek HT250EW 0.5 mg of Pt/cm$^2$, 0.7 mg Nafion/cm$^2$).

Figure 6:
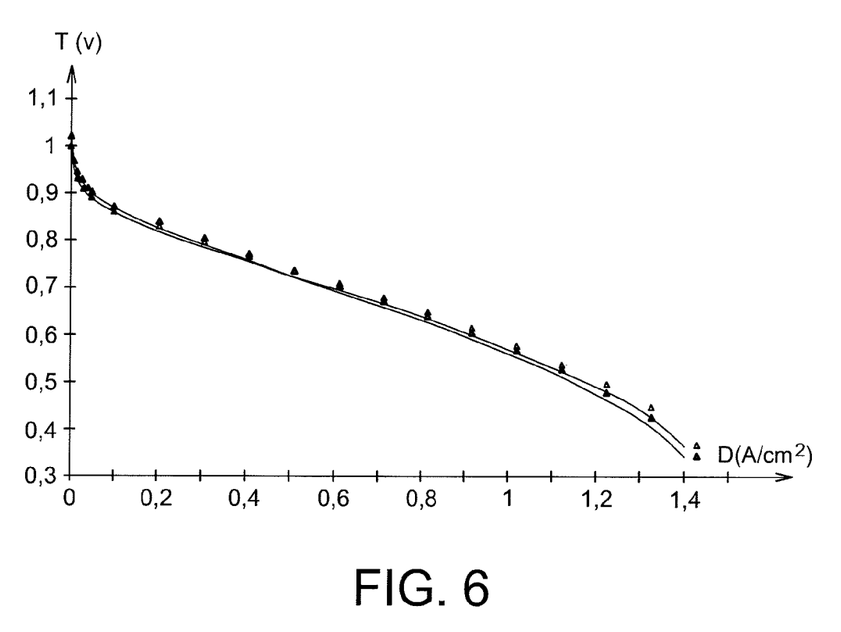
FIG. 6 is a graph illustrating the biasing curve, i.e. the cell voltage T (in V) versus the current density D (in A/cm$^2$) for an electrode-membrane assembly made according to Example 4.

The results of the stacking tests conducted under optimum operating conditions for the assembly (70° C., under 2 bars, $H_2/O_2$ gas supply, dry gas) are transferred to FIG. 6. This figure shows a graph illustrating the biasing curve, i.e. the cell voltage T (in V) versus the current density D (in A/cm$^2$) obtained with an assembly as mentioned above. The bipolar plates do not deteriorate the electrochemical performances of the cell core. The novel plates are therefore not very active from the point of view of electrochemical performances of the PEMFC fuel cell core, as this may be seen from the curve of FIG. 6.

The invention claimed is:

1. A method for manufacturing an electrically conducting article, the method comprising:
dry mixing a powder comprising at least one thermosetting resin, a hardener compound powder of said resin, a catalyst powder, and an electrically conducting filler powder, the thermosetting resin comprising at least two epoxide groups and the catalyst powder being a substituted urea;
thermocompressing, at an effective temperature, the mixture of powders in a mold with a shape adapted to a shape of the electrically conducting article, the effective temperature corresponding to a temperature at which cross-linking of the resin occurs.

2. The method according to claim 1, wherein the powder comprising the at least one thermosetting resin has an average particle size ranging from about 10 μm to about 500 μm, and wherein the hardener compound powder and the electrically conducting filler powder each have a particle size ranging from about 10 to about 500 μm.

3. The method according to claim 1, wherein the powder comprising the at least one thermosetting resin has an average particle size ranging from about 75 μm to about 150 μm, and wherein the hardener compound powder and the electrically conducting filler powder each have a particle size ranging from about 75 μm to about 150 μm.

4. The method according to claim 1, wherein the thermosetting resin is one of the following formulae or a mixture thereof:

wherein $n_1$ represents the number of occurrences of the unit taken between square brackets;

and wherein $n_2$ represents the number of occurrences of the unit taken between square brackets.

5. The method according to claim 1, wherein the hardener compound comprises a compound capable of generating the cross-linking reaction for the resin.

6. The method according to claim 1, wherein the hardener compound is selected from the group consisting of aliphatic amine compounds, amido-amines, polyamides, polyetheramines, cycloaliphatic amines, anhydrides, aromatic amines, and imidazole compounds.

7. The method according to claim 1, wherein the hardener compound is a dicyandiamide of the following formula:

8. The method according to claim 1, wherein the hardener compound is 2-phenylimidazole of the following formula:

9. The method according to claim 1, wherein the electrically conducting filler powder is a powder of carbonaceous material selected from the group consisting of graphite powders and carbon black powders.

10. The method according to claim 1, wherein mixing further comprises mixing a lamellar graphite.

11. The method according to claim 1, wherein the catalyst comprises a substituted urea of the following formula:

12. A method for manufacturing an electrically conducting article, the method comprising:
  dry mixing a powder comprising at least one thermosetting resin, a hardener compound powder of said resin and an electrically conducting filler powder, the thermosetting resin comprising at least two epoxide groups wherein the mixture of powders is one of the following mixtures:
  a mixture of powders comprising:
    a powder of epoxide resin of the following formula:

wherein $n_1$ represents the number of occurrences of the unit taken between square brackets;

a powder of dicyandiamide hardener compound of the following formula:

a powder of a catalyst of the following formula:

and;

a powder of synthetic graphite and optionally lamellar graphite;

a mixture of powders comprising:

a powder of epoxide resin of the following formula:

wherein $n_2$ represents the number of occurrences of the unit taken between square brackets;

a powder of epoxide resin of the following formula:

wherein $n_1$ represents the number of occurrences of the unit taken between square brackets;

a powder of a dicyandiamide hardener compound of the following formula:

a powder of catalyst of the following formula:

and;

a powder of synthetic graphite; and a mixture of powders comprising:

a powder of epoxide resin of the following formula:

wherein $n_1$ represents the number of occurrences of the unit taken between square brackets;

a powder of imidazole hardener compound of the following formula:

and;

a powder of synthetic graphite; and thermocompressing, at an effective temperature, the mixture of powders in a mold with a shape adapted to a shape of the electrically conducting article, the effective temperature corresponding to a temperature at which cross-linking of the resin occurs.

13. The method according to claim 1, wherein the electrically conducting filler powder accounts for about 50% to about 95% by mass of the total mass of the mixture.

14. The method according to claim 1, wherein thermocompressing comprises thermocompressing the mixture of powders at a temperature corresponding to a pressure of less than or equal to 1 t/cm$^2$.

15. The method according to claim 1, wherein the electrically conducting article comprises a bipolar plate of a fuel cell.

16. The method according to claim 1, wherein the electrically conducting filler powder accounts for 80% to about 92% by mass of the total mass of the mixture.

17. The method according to claim 1, wherein thermocompressing comprises thermocompressing the mixture of powders at a temperature corresponding to a pressure between about 250 kg/cm$^2$ and 750 kg/cm$^2$.

* * * * *